(12) United States Patent
Kim et al.

(10) Patent No.: US 10,378,627 B2
(45) Date of Patent: Aug. 13, 2019

(54) PLANETARY GEAR TRAIN OF AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Jong Soo Kim, Seoul (KR); Dong Hwan Hwang, Seoul (KR); Jong Sool Park, Hwaseong-si (KR); Kyeong Hun Lee, Seoul (KR); Jin Ho Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 20 days.

(21) Appl. No.: 15/815,895

(22) Filed: Nov. 17, 2017

(65) Prior Publication Data

US 2019/0024768 A1    Jan. 24, 2019

(30) Foreign Application Priority Data

Jul. 18, 2017 (KR) .......................... 10-2017-0090728

(51) Int. Cl.
*F16H 37/04* (2006.01)
*F16H 3/66* (2006.01)

(52) U.S. Cl.
CPC ............. *F16H 37/04* (2013.01); *F16H 3/666* (2013.01); *F16H 2037/048* (2013.01); *F16H 2200/0065* (2013.01); *F16H 2200/0069* (2013.01); *F16H 2200/2012* (2013.01); *F16H 2200/2046* (2013.01)

(58) Field of Classification Search
CPC .. F16H 3/666; F16H 37/04; F16H 2200/0065; F16H 2200/0069; F16H 2200/2012; F16H 2200/2046
USPC ......................................................... 475/275
See application file for complete search history.

(56) References Cited

U.S. PATENT DOCUMENTS

| 7,717,819 | B2 * | 5/2010 | Wittkopp | F16H 3/66 475/218 |
| 8,251,857 | B1 * | 8/2012 | Mellet | F16H 3/666 475/280 |
| 9,217,494 | B2 * | 12/2015 | Hoffman | F16H 3/66 |
| 9,777,804 | B2 * | 10/2017 | Lee | F16H 3/66 |

(Continued)

*Primary Examiner* — Leslie A Nicholson, III
(74) *Attorney, Agent, or Firm* — Brinks Gilson & Lione

(57) ABSTRACT

A planetary gear train of an automatic transmission includes: first to fourth planetary gear sets respectively having first to third, fourth to sixth, seventh to ninth, and tenth to twelfth rotational elements; first and second external gear sets respectively having thirteenth and fourteenth rotational elements and fifteenth and sixteenth rotational elements; an input shaft coaxially arranged with the first, second, and third planetary gear sets and the thirteenth and fifteenth rotational elements; and an output shaft arranged in parallel with the input shaft and coaxial with the fourth planetary gear set and the fourteenth and sixteenth rotational elements. In particular, the second and eleventh rotational elements are fixedly connected with the input shaft and the output shaft respectively, and the seventh and fifth rotational elements are externally gear-meshed with the tenth and twelfth rotational elements through the first and second external gear sets respectively.

20 Claims, 13 Drawing Sheets

(56) References Cited

U.S. PATENT DOCUMENTS

| | | | | |
|---|---|---|---|---|
| 9,897,176 B2* | 2/2018 | Lee | .................. | F16H 3/666 |
| 9,951,848 B2* | 4/2018 | Lee | .................. | F16H 3/663 |
| 10,047,835 B2* | 8/2018 | Kim | .................. | F16H 3/66 |
| 10,145,452 B2* | 12/2018 | Lee | .................. | F16H 3/66 |
| 10,184,552 B2* | 1/2019 | Lee | .................. | F16H 37/04 |
| 2010/0062893 A1* | 3/2010 | Antonov | .................. | F16H 3/66 |
| | | | | 475/275 |
| 2018/0100568 A1* | 4/2018 | Kim | .................. | F16H 3/66 |
| 2018/0163824 A1* | 6/2018 | Kim | .................. | F16H 3/666 |
| 2018/0163825 A1* | 6/2018 | Kim | .................. | F16H 3/666 |
| 2018/0306291 A1* | 10/2018 | Lee | .................. | F16H 37/04 |
| 2019/0024767 A1* | 1/2019 | Lee | .................. | F16H 37/04 |

* cited by examiner

FIG. 2

| Shift-stage | Clutch | | | | Brake | | Gear ratio | Step ratio | Remark |
|---|---|---|---|---|---|---|---|---|---|
| | C1 | C2 | C3 | C4 | B1 | B2 | | | |
| REV | | | ● | | ● | ● | -2.70 | - | Gear ratio span : 8.26 R/D1 ratio : -0.56 |
| N | | | | | ● | ● | - | - | |
| D1 | ● | | | | ● | ● | 4.85 | - | |
| D2 | | ● | | | ● | ● | 3.29 | 1.48 | |
| D3 | ● | ● | | | | ● | 2.28 | 1.44 | |
| D4 | | ● | ● | | | ● | 1.73 | 1.32 | |
| D5 | ● | | ● | | | ● | 1.27 | 1.35 | |
| D6 | ● | | ● | ● | | | 1.01 | 1.27 | |
| D7 | ● | ● | ● | | | | 0.87 | 1.16 | |
| D8 | ● | | ● | | ● | | 0.71 | 1.22 | |
| D9 | | ● | ● | | ● | | 0.59 | 1.21 | |

FIG. 3

| Shift-stage | Clutch | | | | Brake | | Gear ratio | Step ratio | Remark |
|---|---|---|---|---|---|---|---|---|---|
| | C1 | C2 | C3 | C4 | B1 | B2 | | | |
| REV | | | ● | | ● | ● | -2.96 | - | |
| N | | | | | ● | ● | - | - | |
| D1 | ● | | | | | ● | ● | 5.33 | - | |
| D2 | | ● | | | ● | ● | 3.61 | 1.48 | Gear ratio span : 9.33  R/D1 ratio : -0.56 |
| D3 | ● | ● | | | | ● | 2.53 | 1.43 | |
| D4 | | ● | ● | | | ● | 1.96 | 1.29 | |
| D5 | ● | | ● | | | ● | 1.47 | 1.33 | |
| D6 | ● | | ● | ● | | | 1.20 | 1.22 | |
| D7 | ● | ● | ● | | | | 1.05 | 1.15 | |
| D8 | ● | | ● | | ● | | 0.86 | 1.21 | |
| D9 | | ● | ● | | ● | | 0.71 | 1.22 | |
| D10 | | | ● | ● | ● | | 0.57 | 1.24 | |

FIG. 9

| Shift-stage | Clutch | | | | Brake | | Gear ratio | Step ratio | Remark |
|---|---|---|---|---|---|---|---|---|---|
| | C1 | C2 | C3 | C4 | B1 | B2 | | | |
| REV |  |  | ● |  | ● | ● | -2.96 | - | Gear ratio span : 8.31<br>R/D1 ratio : -0.56 |
| N |  |  |  |  | ● | ● | - | - | |
| D1 | ● |  |  |  | ● | ● | 5.33 | - | |
| D2 |  | ● |  |  | ● | ● | 3.61 | 1.48 | |
| D3 | ● | ● |  |  |  | ● | 2.49 | 1.45 | |
| D4 |  | ● | ● |  |  | ● | 1.88 | 1.32 | |
| D5 | ● |  | ● |  |  | ● | 1.39 | 1.35 | |
| D6 | ● |  | ● | ● |  |  | 1.10 | 1.26 | |
| D7 | ● | ● | ● |  |  |  | 0.95 | 1.16 | |
| D8 | ● |  | ● |  | ● |  | 0.78 | 1.22 | |
| D9 |  | ● | ● |  | ● |  | 0.64 | 1.21 | |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2017-0090728, filed on Jul. 18, 2017, which is incorporated herein by reference in its entirety.

FIELD

The present disclosure relates to an automatic transmission for a vehicle.

BACKGROUND

The statements in this section merely provide background information related to the present disclosure and may not constitute prior art.

Recently, increase of oil price leads more competition in enhancing fuel consumption of a vehicle.

In this sense, research on an automatic transmission has been performed to simultaneously provide better drivability and fuel consumption by achieving more shift stages.

In order to achieve more shift stages for an automatic transmission, the number of parts is typically increased, which may deteriorate installability, production cost, weight and/or power flow efficiency.

Therefore, in order to improve fuel consumption of an automatic transmission having more shift stages, it is important for better efficiency to be derived by a smaller number of parts.

In this background, an eight-speed automatic transmission has been introduced recently and a planetary gear train for an automatic transmission enabling more shift-stages has been developed.

An automatic transmission of eight or more shift-stages typically includes three to four planetary gear sets and five to six control elements (frictional elements), and may easily become lengthy, thereby deteriorating installability.

The above information disclosed in this Background section is only for enhancement of understanding of the background of the present disclosure and therefore it may contain information that does not form the prior art that is already known to a person of ordinary skill in the art.

SUMMARY

The present disclosure provides a planetary gear train of an automatic transmission for a vehicle having advantages of realizing at least nine forward speeds and at least one reverse speed by a combination of four planetary gear sets, two external gears and six control elements, thereby providing improvement of power delivery performance and fuel consumption and improving installability by reducing a length of the transmission.

In addition, a wide available range of varying gear teeth of transfer gears enables easily obtaining desired gear ratios for respective vehicles, thereby improving power delivery performance and fuel consumption.

A planetary gear train according to an exemplary form includes: a first planetary gear set having first, second, and third rotational elements; a second planetary gear set having fourth, fifth, and sixth rotational elements; a third planetary gear set having seventh, eighth, and ninth rotational elements; a fourth planetary gear set having tenth, eleventh, and twelfth rotational elements; a first external gear set having thirteenth and fourteenth rotational elements; a second external gear set having fifteenth and sixteenth rotational elements; an input shaft coaxially arranged with the first, second, and third planetary gear sets and the thirteenth and fifteenth rotational elements; and an output shaft arranged in parallel with the input shaft and coaxial with the fourth planetary gear set and the fourteenth and sixteenth rotational elements. The second rotational element may be fixedly connected with the input shaft, The seventh rotational element may be externally gear-meshed with the tenth rotational element through the first external gear set. The fifth rotational element may be externally gear-meshed with the twelfth rotational element through the second external gear set, and the eleventh rotational element may be fixedly connected with the output shaft.

In another form, an exemplary planetary gear train may include: a first shaft fixedly connected with the first rotational element and the fourth rotational element and selectively connected with a transmission housing, a second shaft fixedly connected with the second rotational element and the input shaft, a third shaft fixedly connected with the third rotational element and the eighth rotational element, a fourth shaft fixedly connected with the fifth rotational element and the fifteenth rotational element, a fifth shaft fixedly connected with the sixth rotational element and selectively connected with the transmission housing, a sixth shaft fixedly connected with the seventh rotational element and the thirteenth rotational element, and selectively connected with the second shaft and the third shaft respectively, a seventh shaft fixedly connected with the ninth rotational element and selectively connected with the fourth shaft, an eighth shaft fixedly connected with the tenth rotational element and the fourteenth rotational element, a ninth shaft fixedly connected with the eleventh rotational element and the output shaft, and a tenth shaft fixedly connected with the twelfth rotational element and the sixteenth rotational element.

Two shafts among the eighth, ninth, and tenth shafts may be selectively interconnected, such that the fourth planetary gear set integrally rotates when the connection of the two shafts is activated.

An exemplary planetary gear train may include: a first clutch arranged between the second shaft and the sixth shaft, a second clutch arranged between the third shaft and the sixth shaft, a third clutch arranged between the fourth shaft and the seventh shaft, a fourth clutch arranged between the eighth shaft and the tenth shaft, a first brake arranged between the first shaft and the transmission housing, and a second brake arranged between the fifth shaft and the transmission housing.

In another form, an exemplary planetary gear train may include: a first clutch arranged between the second shaft and the sixth shaft, a second clutch arranged between the third shaft and the sixth shaft, a third clutch arranged between the fourth shaft and the seventh shaft, a fourth clutch arranged between the eighth shaft and the ninth shaft, a first brake arranged between the first shaft and the transmission housing, and a second brake arranged between the fifth shaft and the transmission housing.

In still another form, an exemplary planetary gear train may include: a first clutch arranged between the second shaft and the sixth shaft, a second clutch arranged between the third shaft and the sixth shaft, a third clutch arranged between the fourth shaft and the seventh shaft, a fourth clutch arranged between the ninth shaft and the tenth shaft, a first brake arranged between the first shaft and the transmission housing, and a second brake arranged between the fifth shaft and the transmission housing.

In other form, an exemplary planetary gear train may include: a first shaft fixedly connected with the first rotational element and the fourth rotational element and selectively connected with a transmission housing; a second shaft fixedly connected with the second rotational element and the input shaft; a third shaft fixedly connected with the third rotational element; a fourth shaft fixedly connected with the fifth rotational element, the fifteenth rotational element, and the ninth rotational element; a fifth shaft fixedly connected with the sixth rotational element and selectively connected with the transmission housing; a sixth shaft fixedly connected with the seventh rotational element and the thirteenth rotational element, and selectively connected with the second shaft and the third shaft respectively; a seventh shaft fixedly connected with the eighth rotational element and selectively connected with the third shaft; an eighth shaft fixedly connected with the tenth rotational element and the fourteenth rotational element; a ninth shaft fixedly connected with the eleventh rotational element and the output shaft; and a tenth shaft fixedly connected with the twelfth rotational element and the sixteenth rotational element, Two shafts among the eighth, ninth, and tenth shafts may be selectively interconnected, such that the fourth planetary gear set integrally rotates when the connection of the two shafts is activated.

An exemplary planetary gear train may include: a first clutch arranged between the second shaft and the sixth shaft, a second clutch arranged between the third shaft and the sixth shaft, a third clutch arranged between the third shaft and the seventh shaft, a fourth clutch arranged between the eighth shaft and the tenth shaft, a first brake arranged between the first shaft and the transmission housing, and a second brake arranged between the fifth shaft and the transmission housing.

In another form, an exemplary planetary gear train may include: a first clutch arranged between the second shaft and the sixth shaft, a second clutch arranged between the third shaft and the sixth shaft, a third clutch arranged between the third shaft and the seventh shaft, a fourth clutch arranged between the eighth shaft and the ninth shaft, a first brake arranged between the first shaft and the transmission housing, and a second brake arranged between the fifth shaft and the transmission housing.

In other form, an exemplary planetary gear train may include: a first clutch arranged between the second shaft and the sixth shaft, a second clutch arranged between the third shaft and the sixth shaft, a third clutch arranged between the third shaft and the seventh shaft, a fourth clutch arranged between the ninth shaft and the tenth shaft, a first brake arranged between the first shaft and the transmission housing, and a second brake arranged between the fifth shaft and the transmission housing.

The first, second, and third rotational elements of the first planetary gear set are a first sun gear, a first planet carrier, and a first ring gear of the first planetary gear set. The fourth, fifth, and sixth rotational elements of the second planetary gear set are a second sun gear, a second planet carrier, and a second ring gear of the second planetary gear set. The seventh, eighth, and ninth rotational elements of the third planetary gear set are a third sun gear, a third planet carrier, and a third ring gear of the third planetary gear set. The tenth, eleventh, and twelfth rotational elements of the fourth planetary gear set are a fourth sun gear, a fourth planet carrier, and a fourth ring gear of the fourth planetary gear set.

The first planetary gear set may be a single pinion planetary gear set. The second planetary gear set may be a single pinion planetary gear set. The third planetary gear set may be a double pinion planetary gear set. The fourth planetary gear set may be a single pinion planetary gear set.

The first, second, and third planetary gear sets may be arranged in the order of the first, second, and third planetary gear sets, in the order of the third, second, and first planetary gear sets, or in the order of the first, third, and second planetary gear sets, from an engine side.

According to a planetary gear train according to an exemplary form of the present disclosure, planetary gear sets are dividedly arranged on input and output shafts disposed in parallel, thereby reducing a length and improving installability.

According to a planetary gear train according to an exemplary form of the present disclosure, at least eight forward speeds and at least one reverse speed may be realized by employing two transfer gears in addition to a combination of planetary gear sets, thereby providing a wide range of varying gear teeth so as to easily achieve desired gear ratio and to easily comply with desired performance for respective vehicles.

In addition, according to a planetary gear train according to an exemplary form of the present disclosure, a gear ratio span of more than 8.2 may be achieved while realizing at least nine forward speeds and at least one reverse speed, thereby increasing an engine driving efficiency.

In addition, the linearity of step ratios of shift stages is secured while multi-staging the shift stage with high efficiency, thereby making it possible to improve drivability such as acceleration before and after a shift, an engine speed rhythmic sense, and the like.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operational chart for respective control elements at respective shift-stages applicable to a planetary gear train according to a first exemplary form of the present disclosure;

FIG. 3 is another operational chart for respective control elements at respective shift-stages applicable to a planetary gear train according to a first exemplary form of the present disclosure;

FIG. 9 is an operational chart for respective control elements at respective shift-stages applicable to a planetary gear train according to a sixth exemplary form of the present disclosure;

Figure 1:
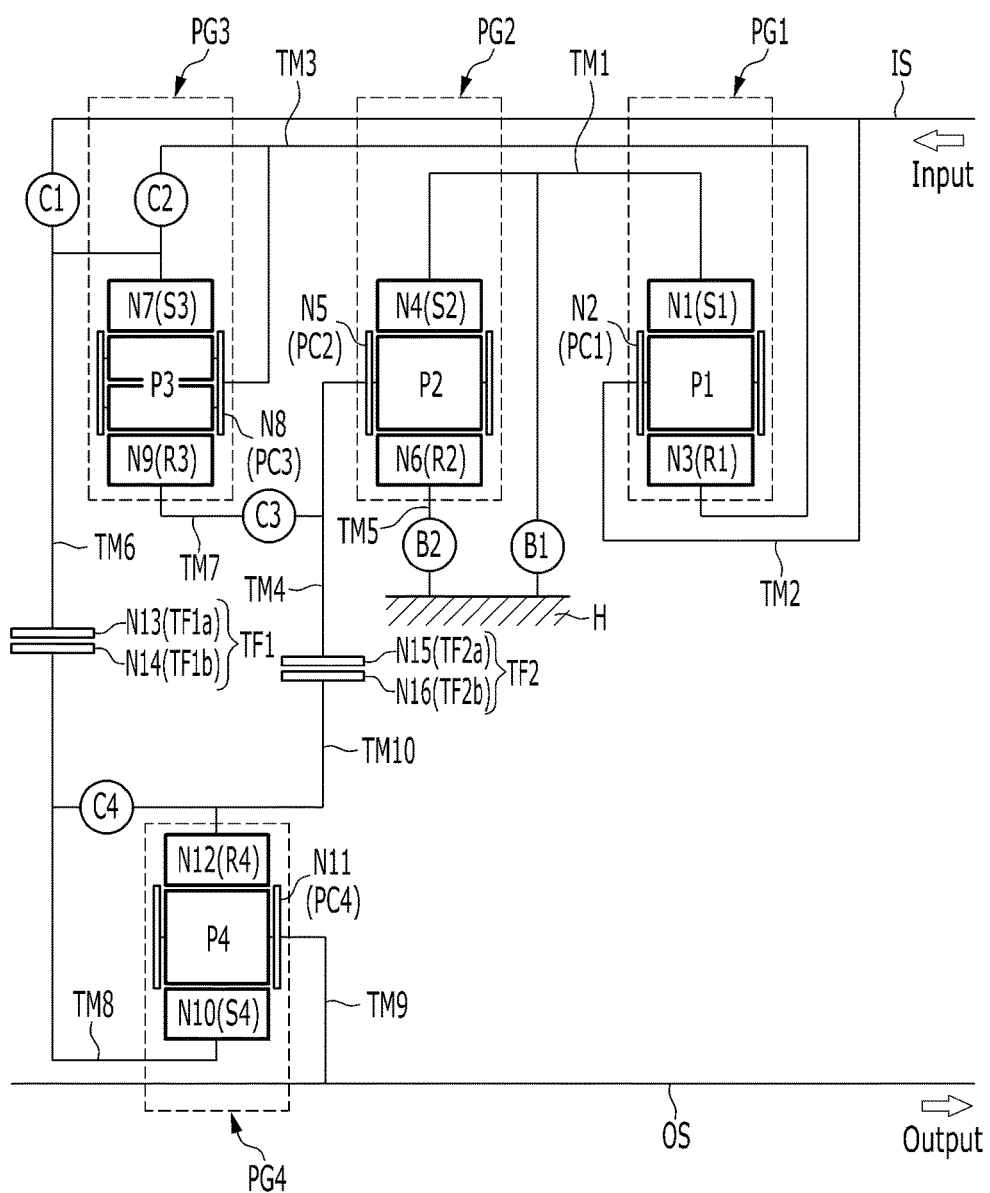
FIG. 1 is a schematic diagram of a planetary gear train according to a first exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic diagram of a planetary gear train according to a first exemplary form of the present disclosure.

Referring to FIG. 1, a planetary gear train includes: an input shaft IS, an output shaft OS, first, second, third, and fourth planetary gear sets PG1, PG2, PG3, and PG4, two external gear sets of first and second transfer gears TF1 and TF2, and engagement elements of four clutches C1, C2, C3, and C4 and two brakes B1 and B2.

The input shaft IS is an input member and the torque from a crankshaft of an engine is input into the input shaft IS, after being torque-converted through a torque converter.

The output shaft OS is an output member, and, arranged in parallel with the input shaft IS, outputs a shifted driving torque to a drive shaft through a differential apparatus. The first, second, and third planetary gear sets PG1, PG2, and PG3 are arranged at external circumference of the input shaft IS and form a main shifting portion. The first, second, and third planetary gear sets PG1, PG2, and PG3 are arranged in the order of the first, second, and third planetary gear sets PG1, PG2, and PG3, from an engine side.

The fourth planetary gear set PG4 is arranged at external circumference of the output shaft OS disposed in parallel with the input shaft IS and forms an auxiliary shifting portion.

The first planetary gear set PG1 is a single pinion planetary gear set, and includes a first sun gear S1, a first planet carrier PC1 that supports first pinion P1 externally engaged with the first sun gear S1, and a first ring gear R1 that is internally engaged with the first pinion P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports second pinion P2 externally engaged with the second sun gear S2, and a second ring gear R2 that is internally engaged with the second pinion P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a double pinion planetary gear set, and includes a third sun gear S3, a third planet carrier PC3 that supports third pinion P3 externally engaged with the third sun gear S3, and a third ring gear R3 that is internally engaged with the third pinion P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that supports fourth pinion P4 externally engaged with the fourth sun gear S4, and a fourth ring gear R4 that is internally engaged with the fourth pinion P4. The fourth sun gear S4 acts as a tenth rotational element N10, the fourth planet carrier PC4 acts as an eleventh rotational element N11, and the fourth ring gear R4 acts as a twelfth rotational element N12.

In the first, second, and third planetary gear sets PG1, PG2, and PG3, the first rotational element N1 is fixedly connected with the fourth rotational element N4, the third rotational element N3 is fixedly connected with the eighth rotational element N8, and seven shafts TM1 to TM7 are formed.

Three shafts TM8 to TM10 are connected to the fourth planetary gear set PG4.

The ten shafts TM1 to TM10 are hereinafter described in detail.

The first shaft TM1 is fixedly connected with first rotational element N1 (first sun gear S1) and fourth rotational element N4 (second sun gear S2), and selectively connected with the transmission housing H, thereby selectively acting as a fixed element.

The second shaft TM2 is fixedly connected with the second rotational element N2 (first planet carrier PC1), and fixedly connected with the input shaft IS, thereby always acting as an input element.

The third shaft TM3 is fixedly connected with third rotational element N3 (first ring gear R1) and eighth rotational element N8 (third planet carrier PC3).

The fourth shaft TM4 is fixedly connected with the fifth rotational element N5 (second planet carrier PC2).

The fifth shaft TM5 is fixedly connected with the sixth rotational element N6 (second ring gear R2), and selectively connected with the transmission housing H, thereby selectively acting as a fixed element.

The sixth shaft TM6 is fixedly connected with the seventh rotational element N7 (third sun gear S3), and is selectively connected with the second shaft TM2 and the third shaft TM3, respectively.

The seventh shaft TM7 is fixedly connected with the ninth rotational element N9 (third ring gear R3), and selectively connected with the fourth shaft TM4.

The eighth shaft TM8 is fixedly connected with the tenth rotational element N10 (fourth sun gear S4), and externally gear-meshed with the sixth shaft TM6.

The ninth shaft TM9 is fixedly connected with the eleventh rotational element N11 (fourth planet carrier PC4), and fixedly connected with the output shaft OS, thereby always acting as an output element.

The tenth shaft TM10 is fixedly connected with the twelfth rotational element N12 (fourth ring gear R4), externally gear-meshed with the fourth shaft TM4, and selectively connected with the eighth shaft TM8.

The first and second transfer gears TF1 and TF2 of externally gear-meshed gear sets deliver a shifted torque of the main shifting portion having the first, second, and third planetary gear sets PG1, PG2, and PG3 to the auxiliary shifting portion having the fourth planetary gear set PG4.

The first transfer gear TF1 includes a thirteenth rotational element N13 of a first transfer gear TF1a connected with the sixth shaft TM6 and a fourteenth rotational element N14 of a first transfer gear TF1b connected with the eighth shaft TM8, and externally gear-meshes the sixth shaft TM6 and the eighth shaft TM8.

The second transfer gear TF2 includes a fifteenth rotational element N15 of a second transfer gear TF2a connected with the fourth shaft TM4 and a sixteenth rotational element N16 of a second transfer gear TF2b connected with the tenth shaft TM10, and externally gear-meshes the fourth shaft TM4 and the tenth shaft TM10.

As a result, respective shafts connected by the first and second transfer gears TF1 and TF2 rotate in opposite directions, and the gear ratios of the first and second transfer gears TF1 and TF2 may be preset in consideration of desired speed ratio of the transmission.

Each of the ten shafts TM1 to TM10 may be a rotational member that fixedly interconnects the input and output shafts and rotational elements of the planetary gear sets PG1, PG2, PG3, and PG4, or may be a rotational member that selectively interconnects a rotational element to the transmission housing H, or may be a fixed member fixed to the transmission housing H.

In the disclosure, when two or more members are described to be "fixedly connected", where the member may be any of a shaft, an input shaft, an output shaft, a rotational member, and a transmission housing, it means that the fixedly connected members always rotate at a same speed.

When two or more members are described to be "selectively connected" by an engagement element, it means that the selectively connected members rotates separately when the engagement element is not engaged, and rotates at a same speed when the engagement element is engaged.

The engagement elements include four clutches C1, C2, C3, and C4 and two brakes B1 and B2, and are arranged as follows.

The first clutch C1 is arranged between the second shaft TM2 and the sixth shaft TM6, such that the second shaft TM2 and the sixth shaft TM6 may selectively become integral.

The second clutch C2 is arranged between the third shaft TM3 and the sixth shaft TM6, such that the third shaft TM3 and the sixth shaft TM6 may selectively become integral.

The third clutch C3 is arranged between the fourth shaft TM4 and the seventh shaft TM7, such that the fourth shaft TM4 and the seventh shaft TM7 may selectively become integral.

The fourth clutch C4 is arranged between the eighth shaft TM8 and the tenth shaft TM10, such that the eighth shaft TM8 and the tenth shaft TM10 may selectively become integral.

The first brake B1 is arranged between the first shaft TM1 and the transmission housing H, such that the first shaft TM1 may selectively act as a fixed element.

The second brake B2 is arranged between the fifth shaft TM5 and the transmission housing H, such that the fifth shaft TM5 may selectively act as a fixed element.

The fourth clutch C4 enables the fourth planetary gear set PG4 to integrally rotate, and for such a purpose the fourth clutch C4 is described to selectively connect the eighth shaft TM8 and the tenth shaft TM10, in the first exemplary form. It will be obviously understood that the same function and result may achieved by selectively connecting two of the tenth, eleventh, and twelfth rotational elements N10, N11, and N12, or alternatively, by selectively connecting two shafts of the eighth shaft TM8, the ninth shaft TM9, and the tenth shaft TM10.

The engagement elements of the first, second, third, and fourth clutches C1, C2, C3, and C4 and the first and second brakes B1 and B2 may be realized as multi-plate hydraulic pressure friction devices that are frictionally engaged by hydraulic pressure, however, it should not be understood to be limited thereto, since various other configuration that are electrically controllable may be available.

FIG. 2 is an operational chart for respective control elements at respective shift-stages applicable to a planetary gear train according to a first exemplary form of the present disclosure.

Referring to FIG. 2, a planetary gear train according to a first exemplary form of the present disclosure realizes shifting by operating three elements among the four clutches C1, C2, C3, and C4 and the two brakes B1 and B2.

[The Forward First Speed]

In the forward first speed D1, the first clutch C1 and the first and second brakes B1 and B2 are simultaneously operated.

As a result, the second shaft TM2 is connected with the sixth shaft TM6 by the operation of the first clutch C1, the torque of the input shaft IS is input to the second shaft TM2, and the first shaft TM1 and the fifth shaft TM5 act as fixed elements by the operation of the first and second brakes B1 and B2, thereby realizing the forward first speed by cooperative operation of respective shafts and outputting a shifted torque to the output shaft OS fixedly connected with the ninth shaft TM9.

[The Forward Second Speed]

In the forward second speed D2, the second clutch C2 and the first and second brakes B1 and B2 are simultaneously operated.

As a result, the third shaft TM3 is connected with the sixth shaft TM6 by the operation of the second clutch C2, the torque of the input shaft IS is input to the second shaft TM2, and the first shaft TM1 and the fifth shaft TM5 act as fixed elements by the operation of the first and second brakes B1 and B2, thereby realizing the forward second speed by cooperative operation of respective shafts and outputting a shifted torque to the output shaft OS fixedly connected with the ninth shaft TM9.

[The Forward Third Speed]

In the forward third speed D3, the first and second clutch C1 and C2 and the second brake B2 are simultaneously operated.

As a result, the second shaft TM2 is connected with the sixth shaft TM6 by the operation of the first clutch C1, the third shaft TM3 is connected with the sixth shaft TM6 by the operation of the second clutch C2, the torque of the input shaft IS is input to the second shaft TM2, and the fifth shaft TM5 acts as a fixed element by the operation of the second brake B2, thereby realizing the forward third speed by cooperative operation of respective shafts and outputting a shifted torque to the output shaft OS fixedly connected with the ninth shaft TM9.

[The Forward Fourth Speed]

In the forward fourth speed D4, the second and third clutches C2 and C3 and the second brake B2 are simultaneously operated.

As a result, the third shaft TM3 is connected with the sixth shaft TM6 by the operation of the second clutch C2, the fourth shaft TM4 is connected with the seventh shaft TM7 by the operation of the third clutch C3, the torque of the input shaft IS is input to the second shaft TM2, and the fifth shaft TM5 acts as a fixed element by the operation of the second brake B2, thereby realizing the forward fourth speed by cooperative operation of respective shafts and outputting a shifted torque to the output shaft OS fixedly connected with the ninth shaft TM9.

[The Forward Fifth Speed]

In the forward fifth speed D5, the first and third clutches C1 and C3 and the second brake B2 are simultaneously operated.

As a result, the second shaft TM2 is connected with the sixth shaft TM6 by the operation of the first clutch C1, the fourth shaft TM4 is connected with the seventh shaft TM7 by the operation of the third clutch C3, the torque of the input shaft IS is input to the second shaft TM2, and the fifth shaft TM5 acts as a fixed element by the operation of the second brake B2, thereby realizing the forward fifth speed by cooperative operation of respective shafts and outputting a shifted torque to the output shaft OS fixedly connected with the ninth shaft TM9.

[The Forward Sixth Speed]

In the forward sixth speed D6, the first, third, and fourth clutches C1, C3, and C4 are simultaneously operated.

As a result, the fourth planetary gear set PG4 integrally rotates by the operation of the fourth clutch C4, the second shaft TM2 is connected with the sixth shaft TM6 by the operation of the first clutch C1, and the fourth shaft TM4 is connected with the seventh shaft TM7 by the operation of the third clutch C3. In this state, torque of the input shaft IS is input to the second shaft TM2.

Then, the torque of the input shaft IS is reversely input to the eighth shaft TM8 through the sixth shaft TM6, thereby realizing the sixth speed depending on the gear ratio of the first transfer gear TF1 and outputting a shifted torque to the output shaft OS fixedly connected with the ninth shaft TM9.

[The Forward Seventh Speed]

In the forward seventh speed D7, the first, second, and third clutches C1, C2, and C3 are simultaneously operated.

As a result, the second shaft TM2 is connected with the sixth shaft TM6 by the operation of the first clutch C1, the third shaft TM3 is connected with the sixth shaft TM6 by the operation of the second clutch C2, the fourth shaft TM4 is connected with the seventh shaft TM7 by the operation of the third clutch C3, and the torque of the input shaft IS is input to the second shaft TM2, thereby realizing the forward seventh speed by cooperative operation of respective shafts and outputting a shifted torque to the output shaft OS fixedly connected with the ninth shaft TM9.

[The Forward Eighth Speed]

In the forward eighth speed D8, the first and third clutches C1 and C3 and the first brake B1 are simultaneously operated.

As a result, the second shaft TM2 is connected with the sixth shaft TM6 by the operation of the first clutch C1, the fourth shaft TM4 is connected with the seventh shaft TM7 by the operation of the third clutch C3, the torque of the input shaft IS is input to the second shaft TM2, and the first shaft TM1 acts as a fixed element by the operation of the first brake B1, thereby realizing the forward eighth speed by cooperative operation of respective shafts and outputting a shifted torque to the output shaft OS fixedly connected with the ninth shaft TM9.

[The Forward Ninth Speed]

In the forward ninth speed D9, the second and third clutches C2 and C3 and the first brake B1 are simultaneously operated.

As a result, the third shaft TM3 is connected with the sixth shaft TM6 by the operation of the second clutch C2, the fourth shaft TM4 is connected with the seventh shaft TM7 by the operation of the third clutch C3, the torque of the input shaft IS is input to the second shaft TM2, and the first shaft TM1 acts as a fixed element by the operation of the first brake B1, thereby realizing the forward ninth speed by cooperative operation of respective shafts and outputting a shifted torque to the output shaft OS fixedly connected with the ninth shaft TM9.

[The Reverse Speed]

In the reverse speed REV, the third clutch C3 and the first and second brakes B1 and B2 are simultaneously operated.

As a result, the fourth shaft TM4 is connected with the seventh shaft TM7 by the operation of the third clutch C3, the torque of the input shaft IS is input to the second shaft TM2, the first shaft TM1 and the fifth shaft TM5 act as fixed elements by the operation of the first and second brakes B1 and B2, thereby realizing the reverse speed by cooperative operation of respective shafts and outputting a reverse torque to the output shaft OS connected with the ninth shaft TM9.

FIG. 2 shows gear ratios calculated under the condition that the gear ratio of the first ring gear R1/the first sun gear S1 is approximately 2.10, the gear ratio of the second ring gear R2/the second sun gear S2 is approximately 3.06, the gear ratio of the third ring gear R3/the third sun gear S3 is approximately 2.22, the gear ratio of the fourth ring gear R4/the fourth sun gear S4 is approximately 3.83, the gear ratio of the first transfer driven gear TF1b/the first transfer drive gear TF1a is approximately 1.01, and the gear ratio of the second transfer driven gear TF2b/the second transfer drive gear TF2a is approximately 0.84.

It is understood that gear ratios for respective shift-stages may be changed when the gear ratios of the first and second transfer gears TF1 and TF2 is changed even when the gear ratios of the first, second, third, and fourth planetary gear sets PG1, PG2, PG3, and PG4 remains the same.

FIG. 3 is another operational chart for respective control elements at respective shift-stages applicable to a planetary gear train according to a first exemplary form of the present disclosure.

Referring to FIG. 3, a planetary gear train according to a first exemplary form of the present disclosure realizes ten forward speeds and one reverse speed by operating three elements among the four clutches C1, C2, C3, and C4 and the two brakes B1 and B2.

Shifting operation from the forward first speed D1 to the forward ninth speed D9 is the same as shown in FIG. 2. The forward tenth speed D10 may be achieved by releasing the operation of the second clutch C2 and operating the fourth clutch C4 from the state of the forward ninth speed D9.

That is, FIG. 3 illustrates that, in comparison with FIG. 2, the forward tenth speed may be additionally achieved.

As a result, the fourth planetary gear set PG4 integrally rotates by the operation of the fourth clutch C4, the fourth shaft TM4 is connected with the seventh shaft TM7 by the operation of the third clutch C3, the torque of the input shaft IS is input to the second shaft TM2, and the first shaft TM1 acts as a fixed element by the operation of the first brake B1, thereby realizing the forward tenth speed by cooperative operation of respective shafts and outputting a shifted torque to the output shaft OS fixedly connected with the ninth shaft TM9.

FIG. 3 shows gear ratios calculated under the condition that the gear ratio of the first ring gear R1/the first sun gear S1 is 2.10, the gear ratio of the second ring gear R2/the second sun gear S2 is 2.71, the gear ratio of the third ring gear R3/the third sun gear S3 is 2.22, the gear ratio of the fourth ring gear R4/the fourth sun gear S4 is 3.43, the gear ratio of the first transfer driven gear TF1$b$/the first transfer drive gear TF1$a$ is 1.20, and the gear ratio of the second transfer driven gear TF2$b$/the second transfer drive gear TF2$a$ is 1.01.

Figure 4:
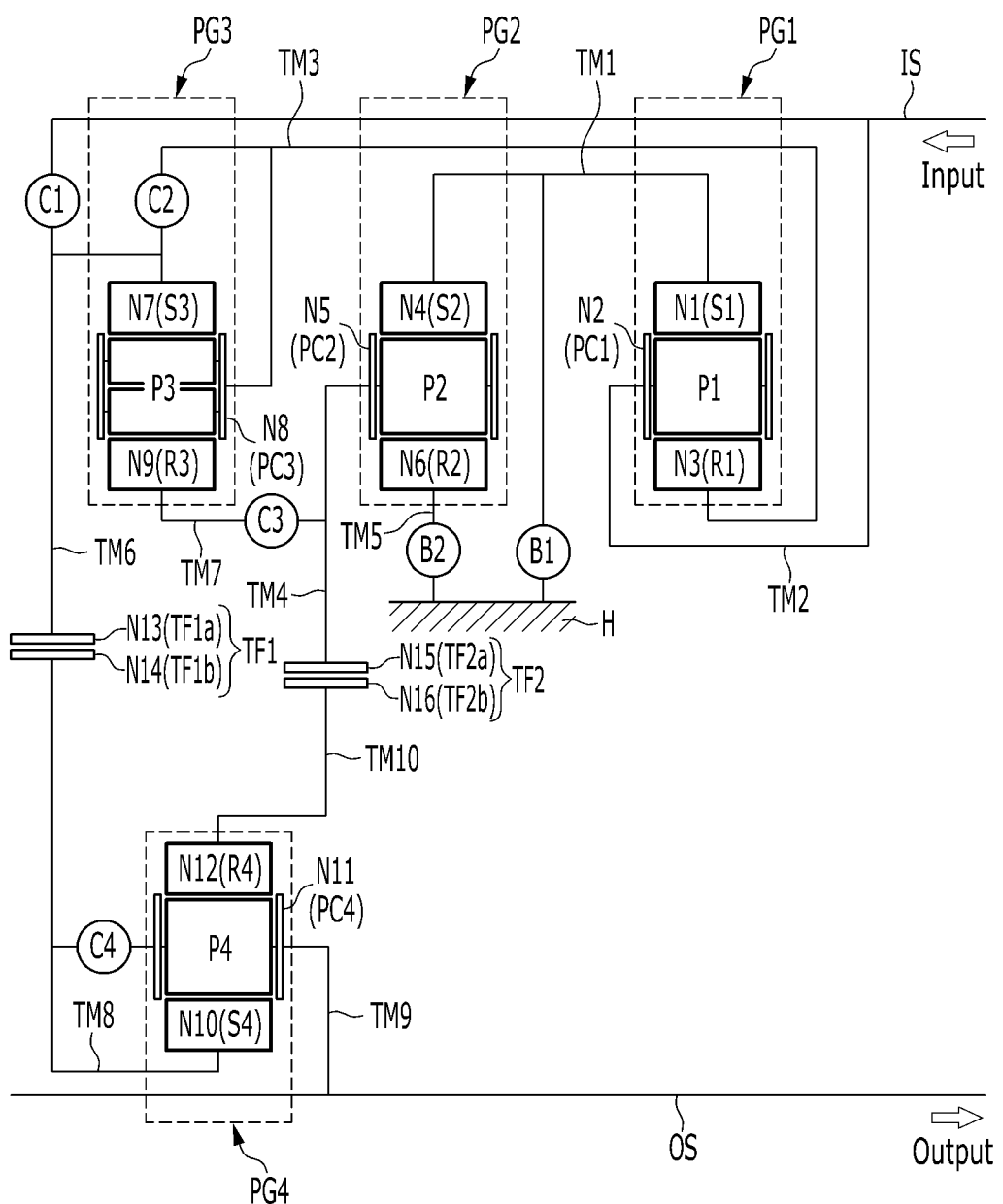
FIG. 4 is a schematic diagram of a planetary gear train according to a second exemplary form of the present disclosure.

FIG. 4 is a schematic diagram of a planetary gear train according to a second exemplary form of the present disclosure.

In a planetary gear train according to a first exemplary form of the present disclosure shown in FIG. 1, the fourth clutch C4 enabling the fourth planetary gear set PG4 to integrally rotate is arranged between the eighth shaft TM8 and the tenth shaft TM10. However, in a planetary gear train according to a second exemplary form, the fourth clutch C4 is arranged between the eighth shaft TM8 and the ninth shaft TM9 as shown in FIG. 4.

As a result, the second exemplary form merely differs from a planetary gear train according to a first exemplary form in the location of the fourth clutch C4, and maintains operation and function of the first exemplary form, which is therefore not described in further detail.

Figure 5:
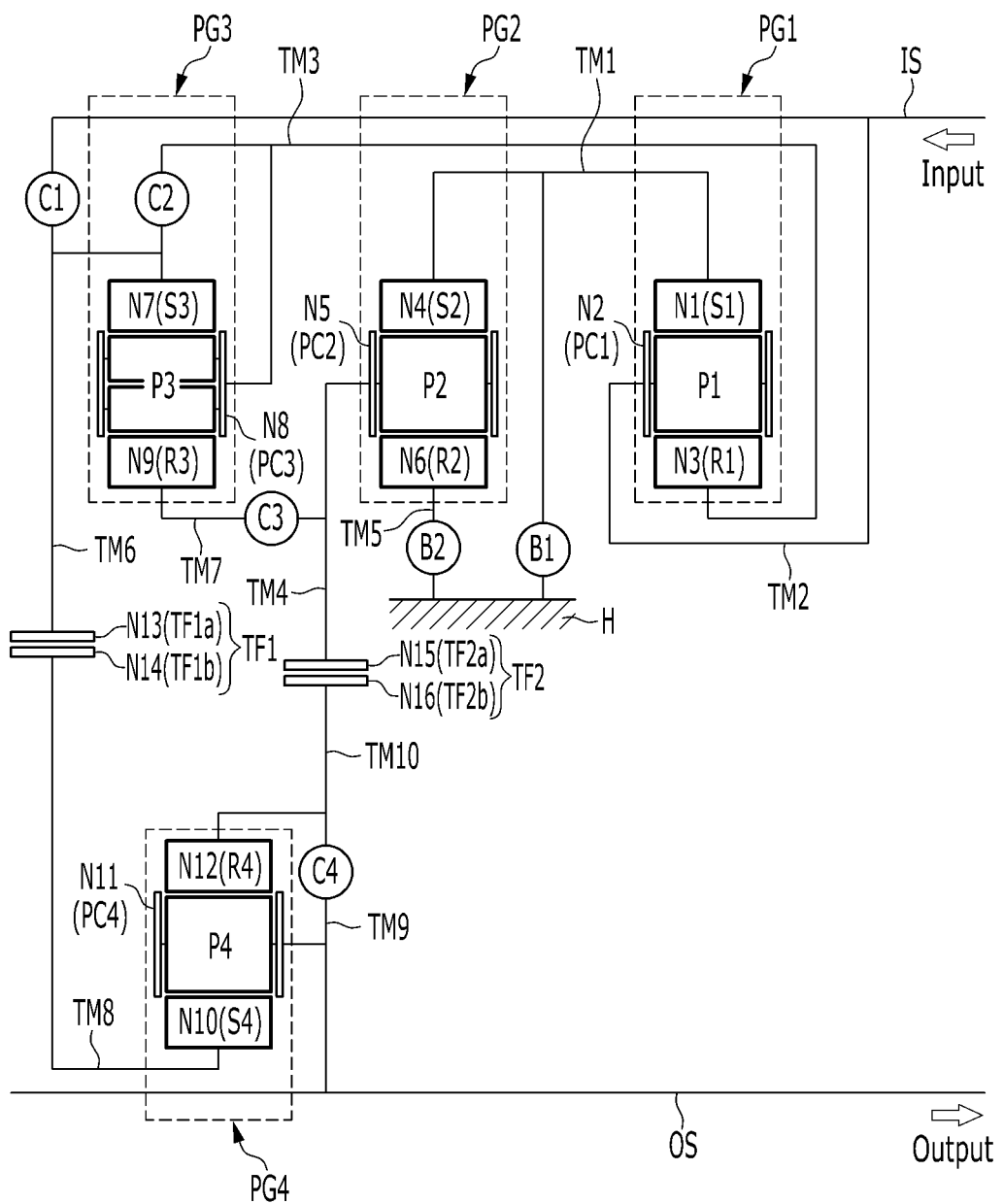
FIG. 5 is a schematic diagram of a planetary gear train according to a third exemplary form of the present disclosure.

FIG. 5 is a schematic diagram of a planetary gear train according to a third exemplary form of the present disclosure.

In a planetary gear train according to a first exemplary form of the present disclosure shown in FIG. 1, the fourth clutch C4 enabling the fourth planetary gear set PG4 to integrally rotate is arranged between the eighth shaft TM8 and the tenth shaft TM10. However, in a planetary gear train according to a third exemplary form, the fourth clutch C4 is arranged between the ninth shaft TM9 and the tenth shaft TM10 as shown in FIG. 5.

As a result, the second exemplary form merely differs from a planetary gear train according to a first exemplary form in the location of the fourth clutch C4, and maintains operation and function of the first exemplary form, which is therefore not described in further detail.

Figure 6:
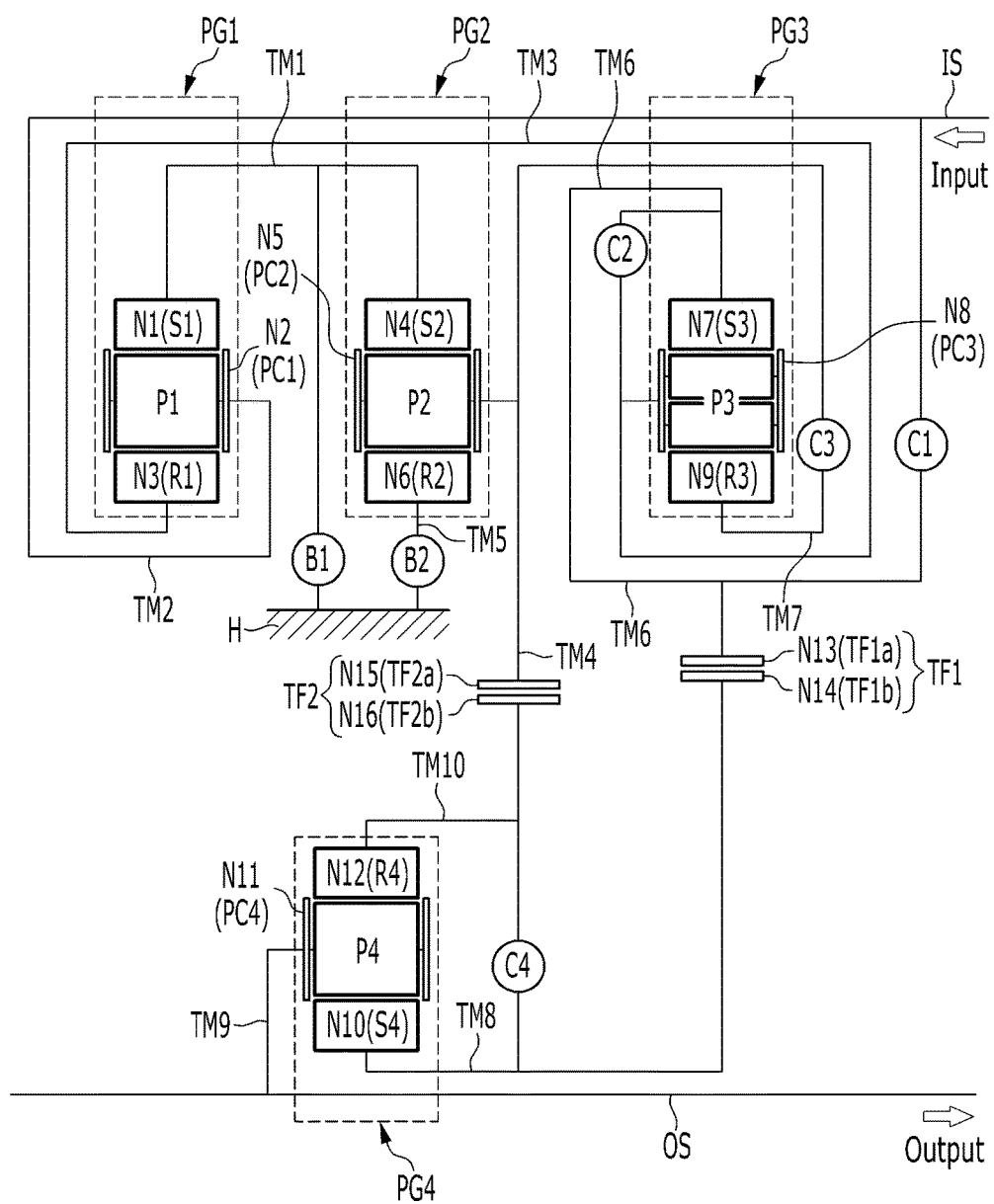
FIG. 6 is a schematic diagram of a planetary gear train according to a fourth exemplary form of the present disclosure.

FIG. 6 is a schematic diagram of a planetary gear train according to a fourth exemplary form of the present disclosure.

In a planetary gear train according to a first exemplary form of the present disclosure shown in FIG. 1, the first, second, and third planetary gear sets PG1, PG2, and PG3 are arranged in the order of the first, second, and third planetary gear sets PG1, PG2, and PG3 from an engine side. However, in a planetary gear train according to a fourth exemplary form, the first, second, and third planetary gear sets PG1, PG2, and PG3 are arranged in the order of the third, second, and first planetary gear sets PG3, PG2, and PG1 from an engine side, as shown in FIG. 6.

As a result, the fourth exemplary form merely differs from a planetary gear train according to a first exemplary form in the location of the first, second, and third planetary gear sets PG1, PG2, and PG3, and maintains operation and function of the first exemplary form, which is therefore not described in further detail.

Figure 7:
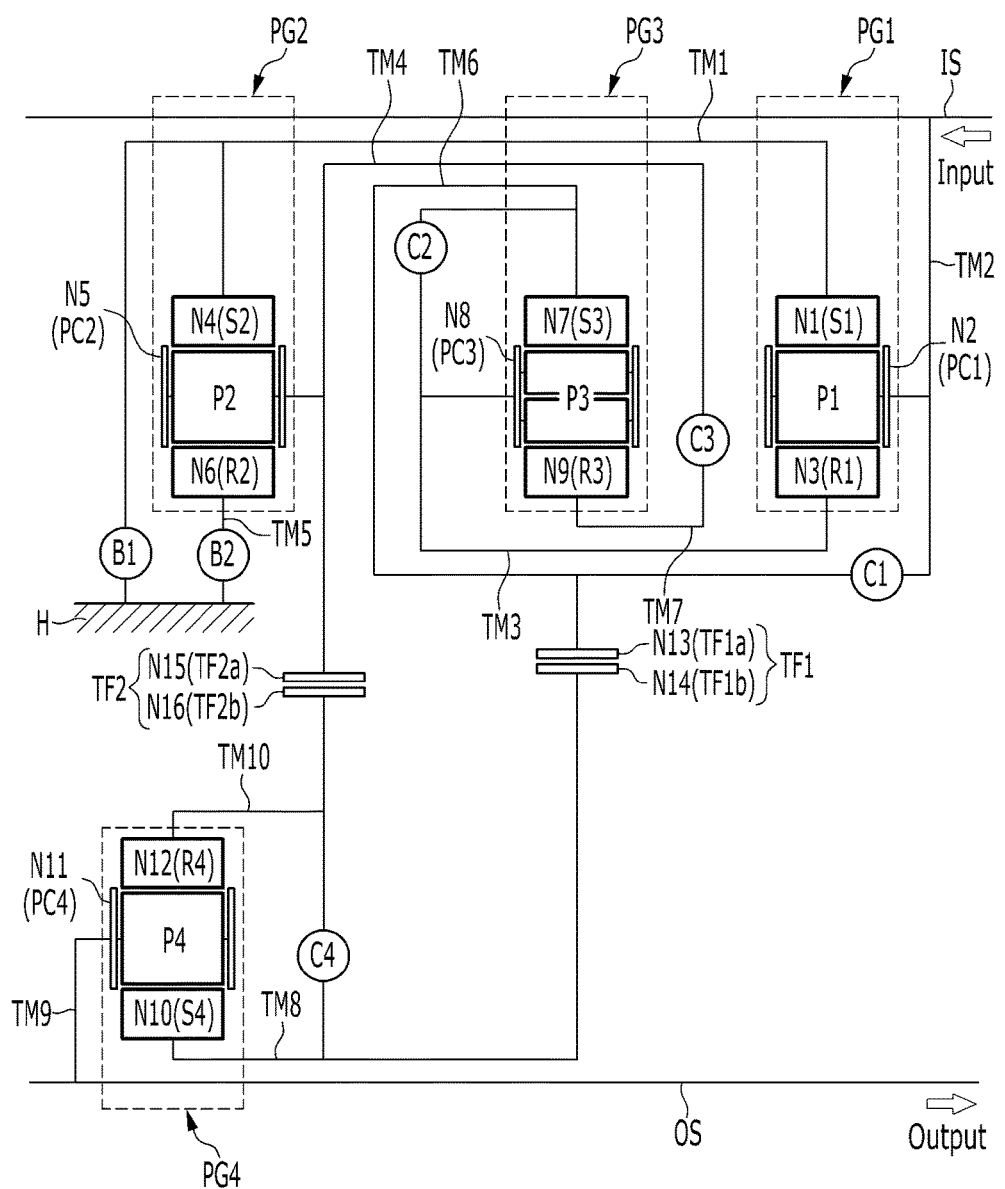
FIG. 7 is a schematic diagram of a planetary gear train according to a fifth exemplary form of the present disclosure.

FIG. 7 is a schematic diagram of a planetary gear train according to a fifth exemplary form of the present disclosure.

In a planetary gear train according to a first exemplary form of the present disclosure shown in FIG. 1, the first, second, and third planetary gear sets PG1, PG2, and PG3 are arranged in the order of the first, second, and third planetary gear sets PG1, PG2, and PG3 from an engine side. However, in a planetary gear train according to a fifth exemplary form, the first, second, and third planetary gear sets PG1, PG2, and PG3 are arranged in the order of the first, third, and second planetary gear sets PG1, PG3, and PG2 from an engine side, as shown in FIG. 7.

As a result, the fifth exemplary form merely differs from a planetary gear train according to a first exemplary form in the location of the first, second, and third planetary gear sets PG1, PG2, and PG3, and maintains operation and function of the first exemplary form, which is therefore not described in further detail.

Figure 8:
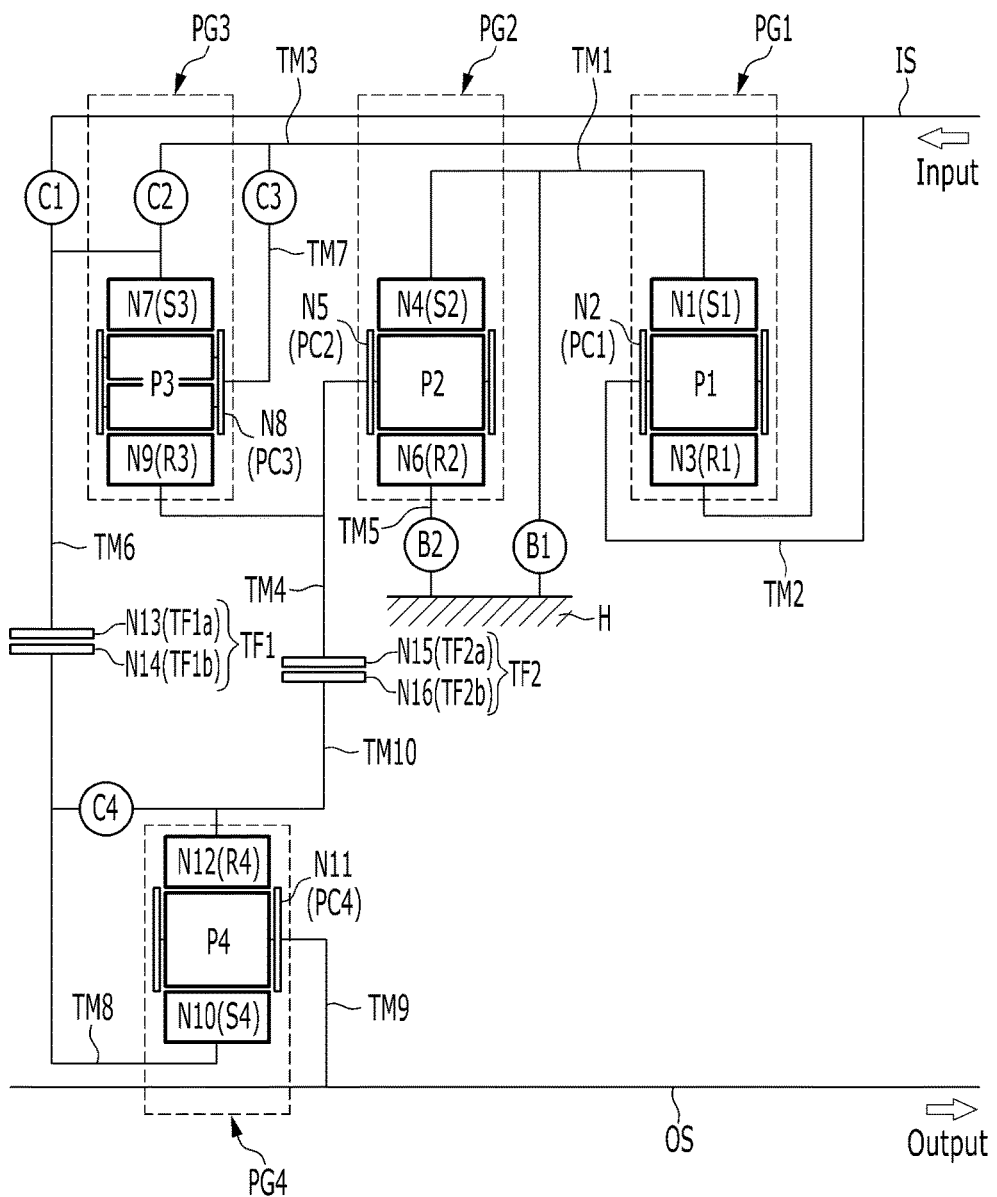
FIG. 8 is a schematic diagram of a planetary gear train according to a sixth exemplary form of the present disclosure.

FIG. 8 is a schematic diagram of a planetary gear train according to a sixth exemplary form of the present disclosure.

According to a sixth exemplary form shown in FIG. 8, in the first, second, and third planetary gear sets PG1, PG2, and PG3, the first rotational element N1 is fixedly connected with the fourth rotational element N4, the fifth rotational element N5 is fixedly connected with the ninth rotational element N9, and seven shafts TM1 to TM7 are formed. Three shafts TM8 to TM10 are connected to the fourth planetary gear set PG4.

The ten shafts TM1 to TM10 are hereinafter described in detail.

The first shaft TM1 is fixedly connected with first rotational element N1 (first sun gear S1) and fourth rotational element N4 (second sun gear S2), and selectively connected with the transmission housing H, thereby selectively acting as a fixed element.

The second shaft TM2 is fixedly connected with the second rotational element N2 (first planet carrier PC1), and fixedly connected with the input shaft IS, thereby always acting as an input element.

The third shaft TM3 is fixedly connected with the third rotational element N3 (first ring gear R1).

The fourth shaft TM4 is fixedly connected with fifth rotational element N5 (second planet carrier PC2) and ninth rotational element N9 (third ring gear R3).

The fifth shaft TM5 is fixedly connected with the sixth rotational element N6 (second ring gear R2), and selectively connected with the transmission housing H, thereby selectively acting as a fixed element.

The sixth shaft TM6 is fixedly connected with the seventh rotational element N7 (third sun gear S3), and is selectively connected with the second shaft TM2 and the third shaft TM3, respectively.

The seventh shaft TM7 is fixedly connected with the eighth rotational element N8 (third planet carrier PC3), and selectively connected with the third shaft TM3.

The eighth shaft TM8 is fixedly connected with the tenth rotational element N10 (fourth sun gear S4), and externally gear-meshed with the sixth shaft TM6.

The ninth shaft TM9 is fixedly connected with the eleventh rotational element N11 (fourth planet carrier PC4), and fixedly connected with the output shaft OS, thereby always acting as an output element.

The tenth shaft TM10 is fixedly connected with the twelfth rotational element N12 (fourth ring gear R4), externally gear-meshed with the fourth shaft TM4, and selectively connected with the eighth shaft TM8.

The first and second transfer gears TF1 and TF2 of externally gear-meshed gear sets deliver a shifted torque of the main shifting portion having the first, second, and third planetary gear sets PG1, PG2, and PG3 to the auxiliary shifting portion having the fourth planetary gear set PG4.

The first transfer gear TF1 includes a thirteenth rotational element N13 of a first transfer gear TF1a connected with the sixth shaft TM6 and a fourteenth rotational element N14 of a first transfer gear TF1b connected with the eighth shaft TM8, and externally gear-meshes the sixth shaft TM6 and the eighth shaft TM8.

The second transfer gear TF2 includes a fifteenth rotational element N15 of a second transfer gear TF2a connected with the fourth shaft TM4 and a sixteenth rotational element N16 of a second transfer gear TF2b connected with the tenth shaft TM10, and externally gear-meshes the fourth shaft TM4 and the tenth shaft TM10.

As a result, respective shafts connected by the first and second transfer gears TF1 and TF2 rotate in opposite directions, and the gear ratios of the first and second transfer gears TF1 and TF2 may be preset in consideration of desired speed ratio of the transmission.

The engagement elements include four clutches C1, C2, C3, and C4 and two brakes B1 and B2, and are arranged as follows.

The first clutch C1 is arranged between the second shaft TM2 and the sixth shaft TM6, such that the second shaft TM2 and the sixth shaft TM6 may selectively become integral.

The second clutch C2 is arranged between the third shaft TM3 and the sixth shaft TM6, such that the third shaft TM3 and the sixth shaft TM6 may selectively become integral.

The third clutch C3 is arranged between the third shaft TM3 and the seventh shaft TM7, such that the third shaft TM3 and the seventh shaft TM7 may selectively become integral.

The fourth clutch C4 is arranged between the eighth shaft TM8 and the tenth shaft TM10, such that the eighth shaft TM8 and the tenth shaft TM10 may selectively become integral.

The first brake B1 is arranged between the first shaft TM1 and the transmission housing H, such that the first shaft TM1 may selectively act as a fixed element.

The second brake B2 is arranged between the fifth shaft TM5 and the transmission housing H, such that fifth shaft TM5 may selectively act as a fixed element.

According to a planetary gear train according to a sixth exemplary form, the third clutch C3 is arranged between the eighth rotational element N8 and the third shaft TM3 and the ninth rotational element N9 is fixedly connected with the fourth shaft TM4, in comparison with the first exemplary form where the third clutch C3 is arranged between the ninth rotational element N9 and the fourth shaft TM4 and the eighth rotational element N8 is fixedly connected with the third shaft TM3. However, such planetary gear train enables shifting by operating engagement elements the same as in FIG. 2 and FIG. 3.

FIG. 9 is an operational chart for respective control elements at respective shift-stages in a planetary gear train according to a sixth exemplary form of the present disclosure.

Referring to FIG. 9, a planetary gear train according to a sixth exemplary form enables nine forward speeds and one reverse speed by operating the engagement element in the same way as in FIG. 2.

FIG. 9 shows gear ratios calculated under the condition that the gear ratio of the first ring gear R1/first sun gear S1 is 2.10, the gear ratio of the second ring gear R2/the second sun gear S2 is 3.06, the gear ratio of the third ring gear R3/the third sun gear S3 is 2.22, the gear ratio of the fourth ring gear R4/the fourth sun gear S4 is 3.83, the gear ratio of the first transfer driven gear TF1b/the first transfer drive gear TF1a is 1.10, and the gear ratio of the second transfer driven gear TF2b/the second transfer drive gear TF2a is 0.91.

A planetary gear train according to a sixth exemplary form may achieve shift-stages of ten forward speeds and one reverse speed by operating the engagement elements in the same way as shown in FIG. 3 in connection with the first exemplary form.

Figure 10:
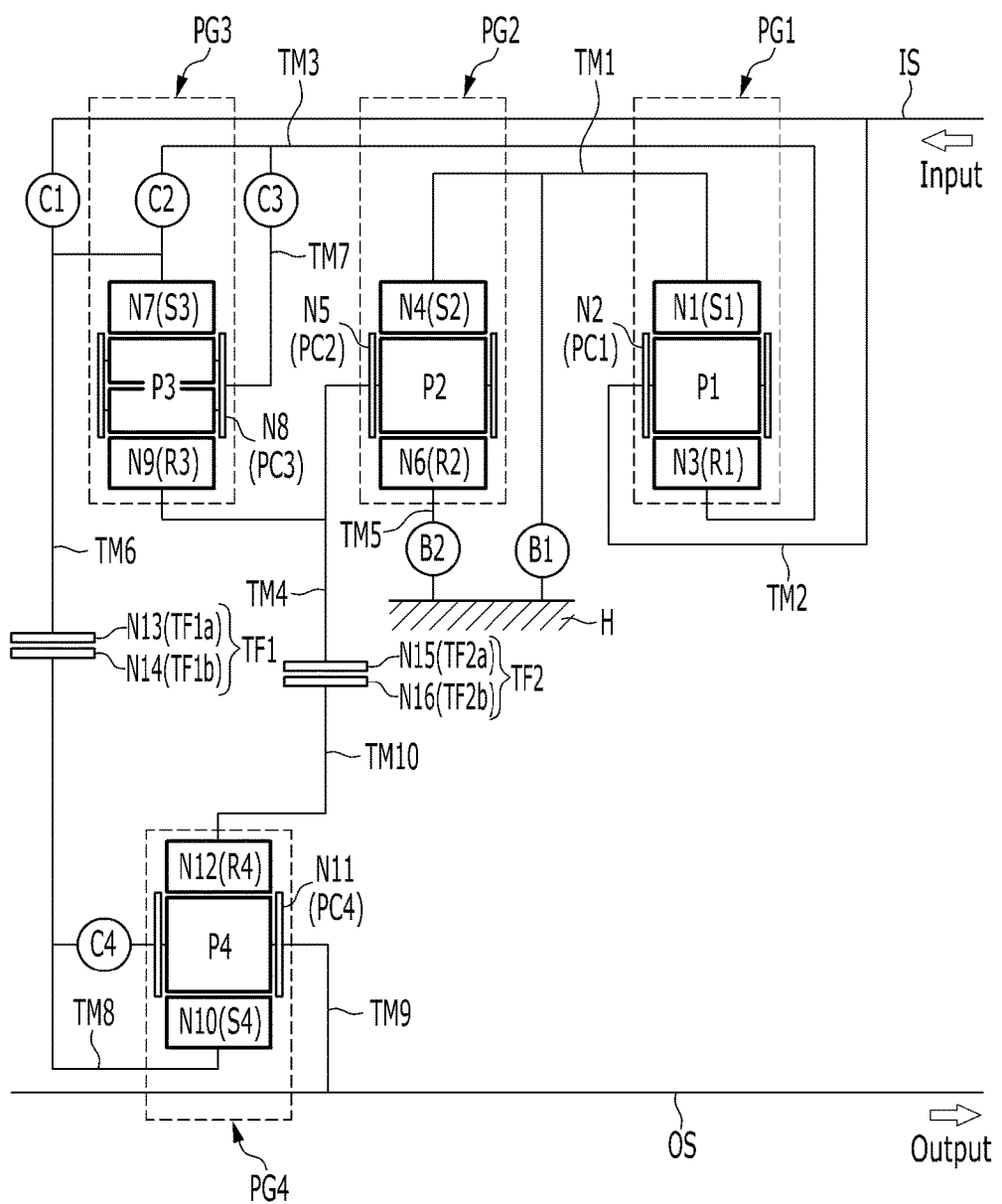
FIG. 10 is a schematic diagram of a planetary gear train according to a seventh exemplary form of the present disclosure.

FIG. 10 is a schematic diagram of a planetary gear train according to a seventh exemplary form of the present disclosure.

In a planetary gear train according to a sixth exemplary form of the present disclosure shown in FIG. 8, the fourth clutch C4 enabling the fourth planetary gear set PG4 to integrally rotate is arranged between the eighth shaft TM8 and the tenth shaft TM10. However, in a planetary gear train according to a seventh exemplary form, the fourth clutch C4 is arranged between the eighth shaft TM8 and the ninth shaft TM9 as shown in FIG. 10.

As a result, the seventh exemplary form merely differs from a planetary gear train according to a sixth exemplary form in the location of the fourth clutch C4, and maintains operation and function of the sixth exemplary form, which is therefore not described in further detail.

Figure 11:
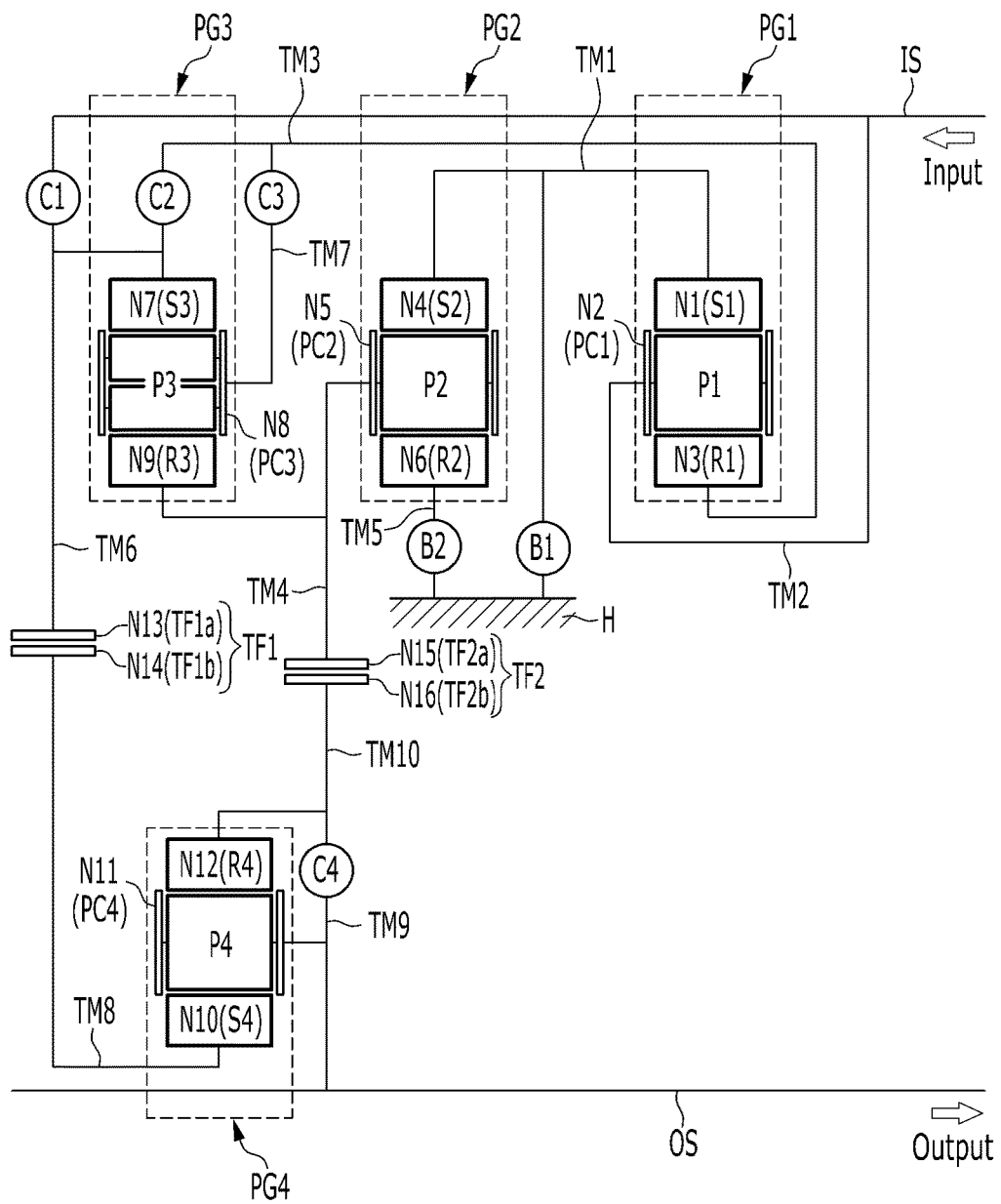
FIG. 11 is a schematic diagram of a planetary gear train according to an eighth exemplary form of the present disclosure.

FIG. 11 is a schematic diagram of a planetary gear train according to an eighth exemplary form of the present disclosure.

In a planetary gear train according to a sixth exemplary form of the present disclosure shown in FIG. 8, the fourth clutch C4 enabling the fourth planetary gear set PG4 to integrally rotate is arranged between the eighth shaft TM8 and the tenth shaft TM10. However, in a planetary gear train according to an eighth exemplary form, the fourth clutch C4 is arranged between the ninth shaft TM9 and the tenth shaft TM10 as shown in FIG. 11.

As a result, the eighth exemplary form merely differs from a planetary gear train according to a sixth exemplary form in the location of the fourth clutch C4, and maintains operation and function of the sixth exemplary form, which is therefore not described in further detail.

Figure 12:
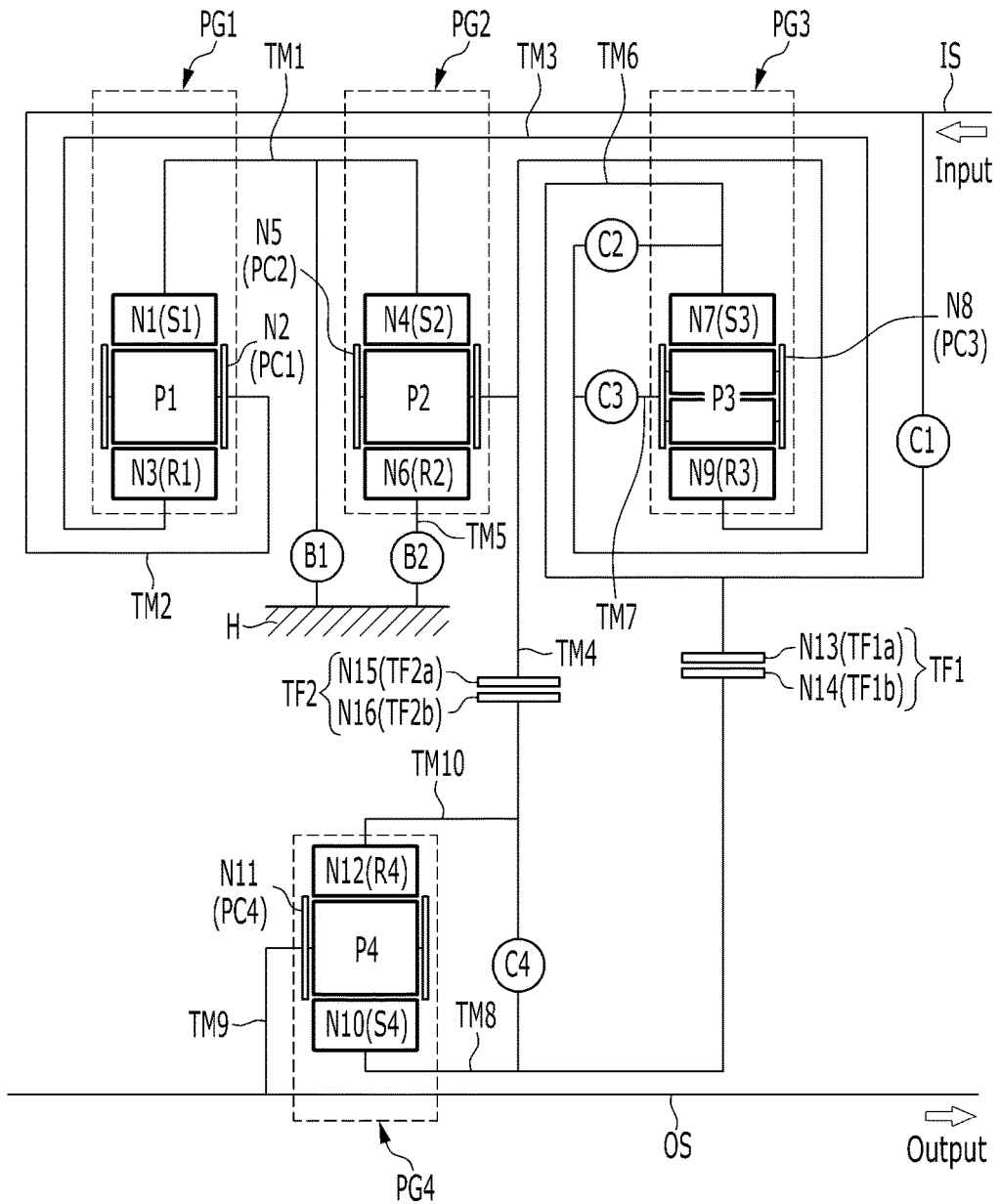
FIG. 12 is a schematic diagram of a planetary gear train according to a ninth exemplary form of the present disclosure.

FIG. 12 is a schematic diagram of a planetary gear train according to a ninth exemplary form of the present disclosure.

Referring to FIG. 12, In a planetary gear train according to a sixth exemplary form of the present disclosure shown in FIG. 8, the first, second, and third planetary gear sets PG1, PG2, and PG3 are arranged in the order of the first, second, and third planetary gear sets PG1, PG2, and PG3 from an engine side. However, in a planetary gear train according to a ninth exemplary form, the first, second, and third planetary gear sets PG1, PG2, and PG3 are arranged in the order of the third, second, and first planetary gear sets PG3, PG2, and PG1 from an engine side.

As a result, the ninth exemplary form merely differs from a planetary gear train according to a sixth exemplary form in the location of the first, second, and third planetary gear sets PG1, PG2, and PG3, and maintains operation and function of the sixth exemplary form, which is therefore not described in further detail.

Figure 13:
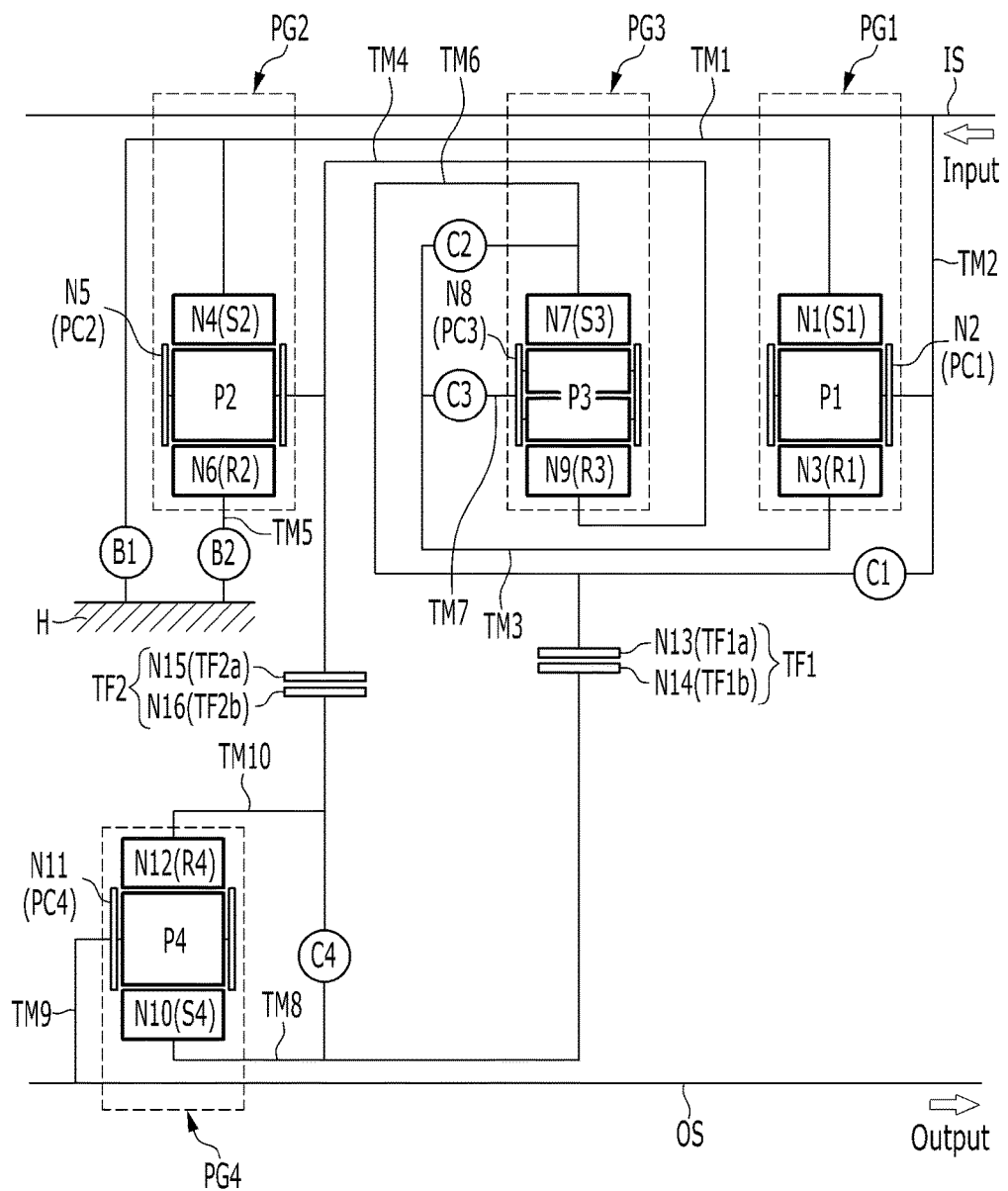
FIG. 13 is a schematic diagram of a planetary gear train according to a tenth exemplary form of the present disclosure.

FIG. 13 is a schematic diagram of a planetary gear train according to a tenth exemplary form of the present disclosure.

Referring to FIG. 13, In a planetary gear train according to a sixth exemplary form of the present disclosure shown in FIG. 8, the first, second, and third planetary gear sets PG1, PG2, and PG3 are arranged in the order of the first, second, and third planetary gear sets PG1, PG2, and PG3 from an engine side. However, in a planetary gear train according to a tenth exemplary form, the first, second, and third planetary gear sets PG1, PG2, and PG3 are arranged in the order of the first, third, second planetary gear sets PG1, PG3, and PG2 from an engine side.

As a result, the tenth exemplary form merely differs from a planetary gear train according to a sixth exemplary form in the location of the first, second, and third planetary gear sets PG1, PG2, and PG3, and maintains operation and function of the sixth exemplary form, which is therefore not described in further detail.

As described above, according to a planetary gear train according to an exemplary form of the present disclosure, at least nine forward speeds and at least one reverse speed may be realized by a combination of four planetary gear sets, two transfer gears, and control elements of four clutches and two brakes, thereby providing improvement of power delivery performance and fuel consumption and improving installability by shortening the length of an automatic transmission.

In addition, according to a planetary gear train according to an exemplary form of the present disclosure, two transfer gears of external gears arranged on the output shaft OS are employed in addition to three planetary gear sets, and thus, gear teeth may be widely varied so as to easily achieve desired gear ratio and to easily comply with desired performance for respective vehicles.

In addition, according to a planetary gear train according to an exemplary form of the present disclosure, a gear ratio span of more than 8.26 may be achieved while realizing nine forward speeds and one reverse speed, or a gear ratio span of more than 9.336 may be achieved while realizing ten forward speeds and one reverse speed. Thus, an engine driving efficiency is increased.

In addition, the linearity of step ratios of shift stages is secured while multi-staging the shift stage with high efficiency, thereby making it possible to improve drivability such as acceleration before and after a shift, an engine speed rhythmic sense, and the like.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the appended claims.

DESCRIPTION OF SYMBOLS

PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
B1, B2: first and second brakes
C1, C2, C3, C4: first, second, third, and fourth clutches
TF1, TF2: first and second transfer gears
TM1, TM2, TM3, TM4, TM5, TM6, TM7, TM8, TM9, TM10: first, second, third, fourth, fifth, sixth, seventh, eighth, ninth, and tenth shafts

What is claimed is:

1. A planetary gear train of an automatic transmission for a vehicle, the planetary gear train comprising:
   a first planetary gear set having first, second, and third rotational elements;
   a second planetary gear set having fourth, fifth, and sixth rotational elements;
   a third planetary gear set having seventh, eighth, and ninth rotational elements;
   a fourth planetary gear set having tenth, eleventh, and twelfth rotational elements;
   a first external gear set having thirteenth and fourteenth rotational elements;
   a second external gear set having fifteenth and sixteenth rotational elements;
   an input shaft coaxially arranged with the first, second, and third planetary gear sets and the thirteenth and fifteenth rotational elements; and
   an output shaft arranged in parallel with the input shaft and coaxial with the fourth planetary gear set and the fourteenth and sixteenth rotational elements,
   wherein the second rotational element is fixedly connected with the input shaft,
   the seventh rotational element is externally gear-meshed with the tenth rotational element through the first external gear set,
   the fifth rotational element is externally gear-meshed with the twelfth rotational element through the second external gear set, and
   the eleventh rotational element is fixedly connected with the output shaft.

2. The planetary gear train of claim 1, further comprising:
   a first shaft fixedly connected with the first rotational element and the fourth rotational element and selectively connected with a transmission housing;
   a second shaft fixedly connected with the second rotational element and the input shaft;
   a third shaft fixedly connected with the third rotational element and the eighth rotational element;

a fourth shaft fixedly connected with the fifth rotational element and the fifteenth rotational element;
a fifth shaft fixedly connected with the sixth rotational element and selectively connected with the transmission housing;
a sixth shaft fixedly connected with the seventh rotational element and the thirteenth rotational element, and selectively connected with the second shaft and the third shaft respectively;
a seventh shaft fixedly connected with the ninth rotational element and selectively connected with the fourth shaft;
an eighth shaft fixedly connected with the tenth rotational element and the fourteenth rotational element;
a ninth shaft fixedly connected with the eleventh rotational element and the output shaft; and
a tenth shaft fixedly connected with the twelfth rotational element and the sixteenth rotational element.

3. The planetary gear train of claim 2, wherein two shafts selected from the eighth, ninth, and tenth shafts are selectively interconnected, such that the fourth planetary gear set integrally rotates when the connection of the selected two shafts is activated.

4. The planetary gear train of claim 3, further comprising:
a first clutch arranged between the second shaft and the sixth shaft;
a second clutch arranged between the third shaft and the sixth shaft;
a third clutch arranged between the fourth shaft and the seventh shaft;
a fourth clutch arranged between the eighth shaft and the tenth shaft;
a first brake arranged between the first shaft and the transmission housing; and
a second brake arranged between the fifth shaft and the transmission housing.

5. The planetary gear train of claim 3, further comprising:
a first clutch arranged between the second shaft and the sixth shaft;
a second clutch arranged between the third shaft and the sixth shaft;
a third clutch arranged between the fourth shaft and the seventh shaft;
a fourth clutch arranged between the eighth shaft and the ninth shaft;
a first brake arranged between the first shaft and the transmission housing; and
a second brake arranged between the fifth shaft and the transmission housing.

6. The planetary gear train of claim 3, further comprising:
a first clutch arranged between the second shaft and the sixth shaft;
a second clutch arranged between the third shaft and the sixth shaft;
a third clutch arranged between the fourth shaft and the seventh shaft;
a fourth clutch arranged between the ninth shaft and the tenth shaft;
a first brake arranged between the first shaft and the transmission housing; and
a second brake arranged between the fifth shaft and the transmission housing.

7. The planetary gear train of claim 1, further comprising:
a first shaft fixedly connected with the first rotational element and the fourth rotational element and selectively connected with a transmission housing;
a second shaft fixedly connected with the second rotational element and the input shaft;
a third shaft fixedly connected with the third rotational element;
a fourth shaft fixedly connected with the fifth rotational element, the fifteenth rotational element, and the ninth rotational element;
a fifth shaft fixedly connected with the sixth rotational element and selectively connected with the transmission housing;
a sixth shaft fixedly connected with the seventh rotational element and the thirteenth rotational element, and selectively connected with the second shaft and the third shaft respectively;
a seventh shaft fixedly connected with the eighth rotational element and selectively connected with the third shaft;
an eighth shaft fixedly connected with the tenth rotational element and the fourteenth rotational element;
a ninth shaft fixedly connected with the eleventh rotational element and the output shaft; and
a tenth shaft fixedly connected with the twelfth rotational element and the sixteenth rotational element.

8. The planetary gear train of claim 7, wherein two shafts selected from the eighth, ninth, and tenth shafts are selectively interconnected, such that the fourth planetary gear set integrally rotates when the connection of the selected two shafts is activated.

9. The planetary gear train of claim 8, further comprising:
a first clutch arranged between the second shaft and the sixth shaft;
a second clutch arranged between the third shaft and the sixth shaft;
a third clutch arranged between the third shaft and the seventh shaft;
a fourth clutch arranged between the eighth shaft and the tenth shaft;
a first brake arranged between the first shaft and the transmission housing; and
a second brake arranged between the fifth shaft and the transmission housing.

10. The planetary gear train of claim 8, further comprising:
a first clutch arranged between the second shaft and the sixth shaft;
a second clutch arranged between the third shaft and the sixth shaft;
a third clutch arranged between the third shaft and the seventh shaft;
a fourth clutch arranged between the eighth shaft and the ninth shaft;
a first brake arranged between the first shaft and the transmission housing; and
a second brake arranged between the fifth shaft and the transmission housing.

11. The planetary gear train of claim 8, further comprising:
a first clutch arranged between the second shaft and the sixth shaft;
a second clutch arranged between the third shaft and the sixth shaft;
a third clutch arranged between the third shaft and the seventh shaft;
a fourth clutch arranged between the ninth shaft and the tenth shaft;
a first brake arranged between the first shaft and the transmission housing; and
a second brake arranged between the fifth shaft and the transmission housing.

12. A planetary gear train of an automatic transmission for a vehicle, the planetary gear train comprising:
- a first planetary gear set having first, second, and third rotational elements;
- a second planetary gear set having fourth, fifth, and sixth rotational elements;
- a third planetary gear set having seventh, eighth, and ninth rotational elements;
- a fourth planetary gear set having tenth, eleventh, and twelfth rotational elements;
- a first external gear set having thirteenth and fourteenth rotational elements;
- a second external gear set having fifteenth and sixteenth rotational elements;
- an input shaft coaxially arranged with the first, second, and third planetary gear sets and the thirteenth and fifteenth rotational elements; and
- an output shaft arranged in parallel with the input shaft and coaxial with the fourth planetary gear set and the fourteenth and sixteenth rotational elements,
- wherein the first rotational element is fixedly connected with the fourth rotational element, and selectively connected with a transmission housing,
- the second rotational element is fixedly connected with the input shaft,
- the fifth rotational element is fixedly connected with the fifteenth rotational element,
- the sixth rotational element is selectively connected with the transmission housing,
- the seventh rotational element is fixedly connected with the thirteenth rotational element, and selectively connected with the second rotational element and the third rotational element respectively,
- the tenth rotational element is fixedly connected with the fourteenth rotational element,
- the eleventh rotational element is fixedly connected with the output shaft, and
- the twelfth rotational element is fixedly connected with the sixteenth rotational element.

13. The planetary gear train of claim 12, wherein two rotational elements selected from the tenth, eleventh, and twelfth rotational elements are selectively interconnected, such that the fourth planetary gear set integrally rotates when the connection of the selected two rotational elements is activated.

14. The planetary gear train of claim 13, wherein:
- the eighth rotational element is fixedly connected with the third rotational element and the ninth rotational element is selectively connected with the fifth rotational element; or
- the eighth rotational element is selectively connected with the third rotational element and the ninth rotational element is fixedly connected with the fifth rotational element.

15. The planetary gear train of claim 14, further comprising:
- a first clutch selectively connecting the second rotational element and the seventh rotational element;
- a second clutch selectively connecting the third rotational element and the seventh rotational element;
- a third clutch selectively connecting the fifth rotational element and the ninth rotational element;
- a fourth clutch selectively connecting the tenth rotational element and the twelfth rotational element;
- a first brake selectively connecting the first rotational element and the transmission housing; and
- a second brake selectively connecting the sixth rotational element and the transmission housing.

16. The planetary gear train of claim 14, further comprising:
- a first clutch selectively connecting the second rotational element and the seventh rotational element;
- a second clutch selectively connecting the third rotational element and the seventh rotational element;
- a third clutch selectively connecting the fifth rotational element and the ninth rotational element;
- a fourth clutch selectively connecting the tenth rotational element and the eleventh rotational element;
- a first brake selectively connecting the first rotational element and the transmission housing; and
- a second brake selectively connecting the sixth rotational element and the transmission housing.

17. The planetary gear train of claim 14, further comprising:
- a first clutch selectively connecting the second rotational element and the seventh rotational element;
- a second clutch selectively connecting the third rotational element and the seventh rotational element;
- a third clutch selectively connecting the fifth rotational element and the ninth rotational element;
- a fourth clutch selectively connecting the eleventh rotational element and the twelfth rotational element;
- a first brake selectively connecting the first rotational element and the transmission housing; and
- a second brake selectively connecting the sixth rotational element and the transmission housing.

18. The planetary gear train of claim 14, further comprising:
- a first clutch selectively connecting the second rotational element and the seventh rotational element;
- a second clutch selectively connecting the third rotational element and the seventh rotational element;
- a third clutch selectively connecting the third rotational element and the eighth rotational element;
- a fourth clutch selectively connecting the tenth rotational element and the twelfth rotational element;
- a first brake selectively connecting the first rotational element and the transmission housing; and
- a second brake selectively connecting the sixth rotational element and the transmission housing.

19. The planetary gear train of claim 14, further comprising:
- a first clutch selectively connecting the second rotational element and the seventh rotational element;
- a second clutch selectively connecting the third rotational element and the seventh rotational element;
- a third clutch selectively connecting the third rotational element and the eighth rotational element;
- a fourth clutch selectively connecting the tenth rotational element and the eleventh rotational element;
- a first brake selectively connecting the first rotational element and the transmission housing; and
- a second brake selectively connecting the sixth rotational element and the transmission housing.

20. The planetary gear train of claim 14, further comprising:
- a first clutch selectively connecting the second rotational element and the seventh rotational element;
- a second clutch selectively connecting the third rotational element and the seventh rotational element;
- a third clutch selectively connecting the third rotational element and the eighth rotational element;

a fourth clutch selectively connecting the eleventh rotational element and the twelfth rotational element;
a first brake selectively connecting the first rotational element and the transmission housing; and
a second brake selectively connecting the sixth rotational element and the transmission housing.

\* \* \* \* \*